# 3,264,965
PHOTOGRAPHIC SHUTTER HAVING MULTIPLE
ESCAPEMENT MECHANISMS
Waldemar T. Rentschler, Calmbach (Enz), Germany,
assignor to Alfred Gauthier, G.m.b.H., Calmbach
(Enz), Germany, a corporation of Germany
Filed Sept. 12, 1963, Ser. No. 308,408
16 Claims. (Cl. 95—53)

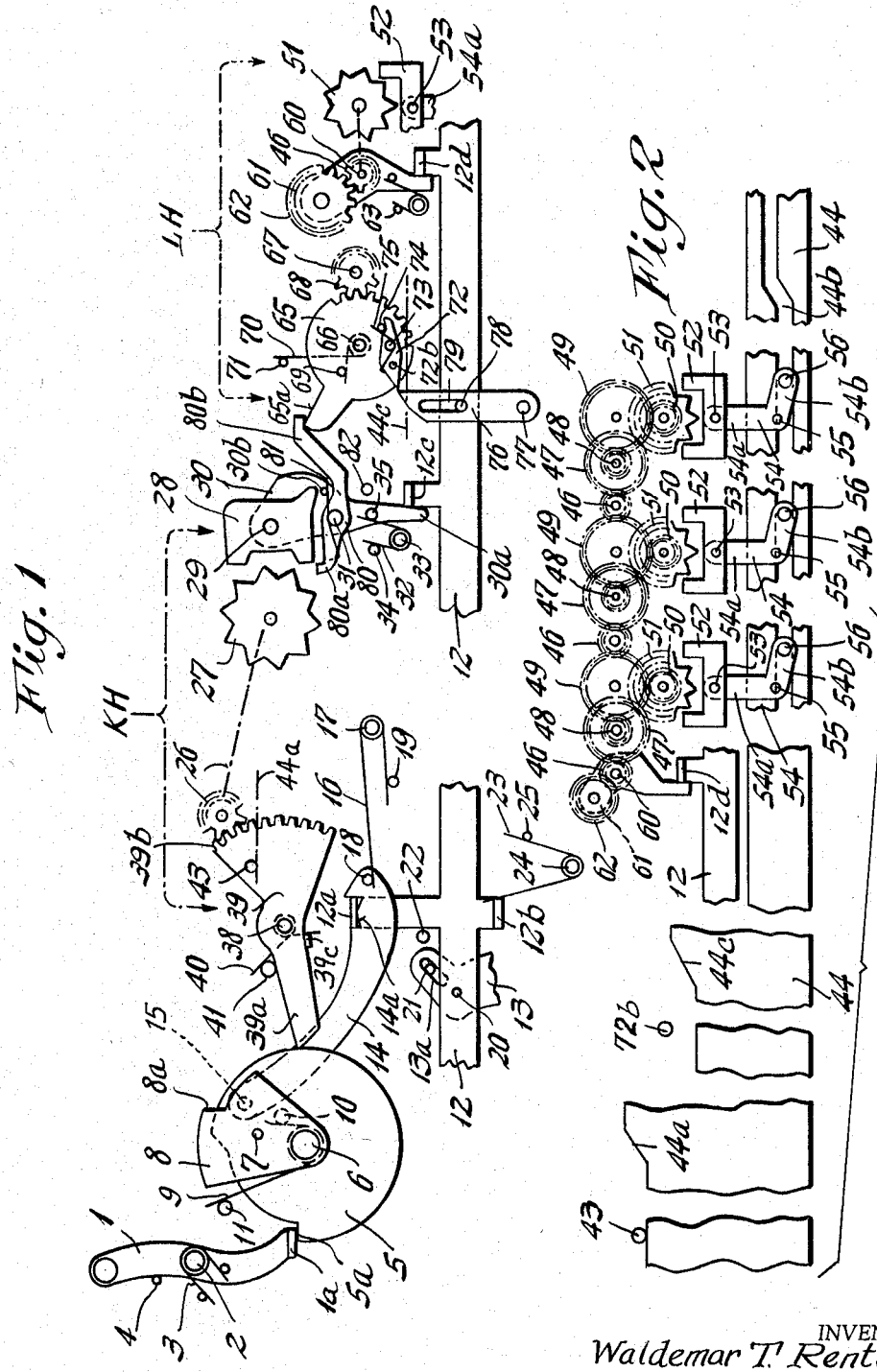

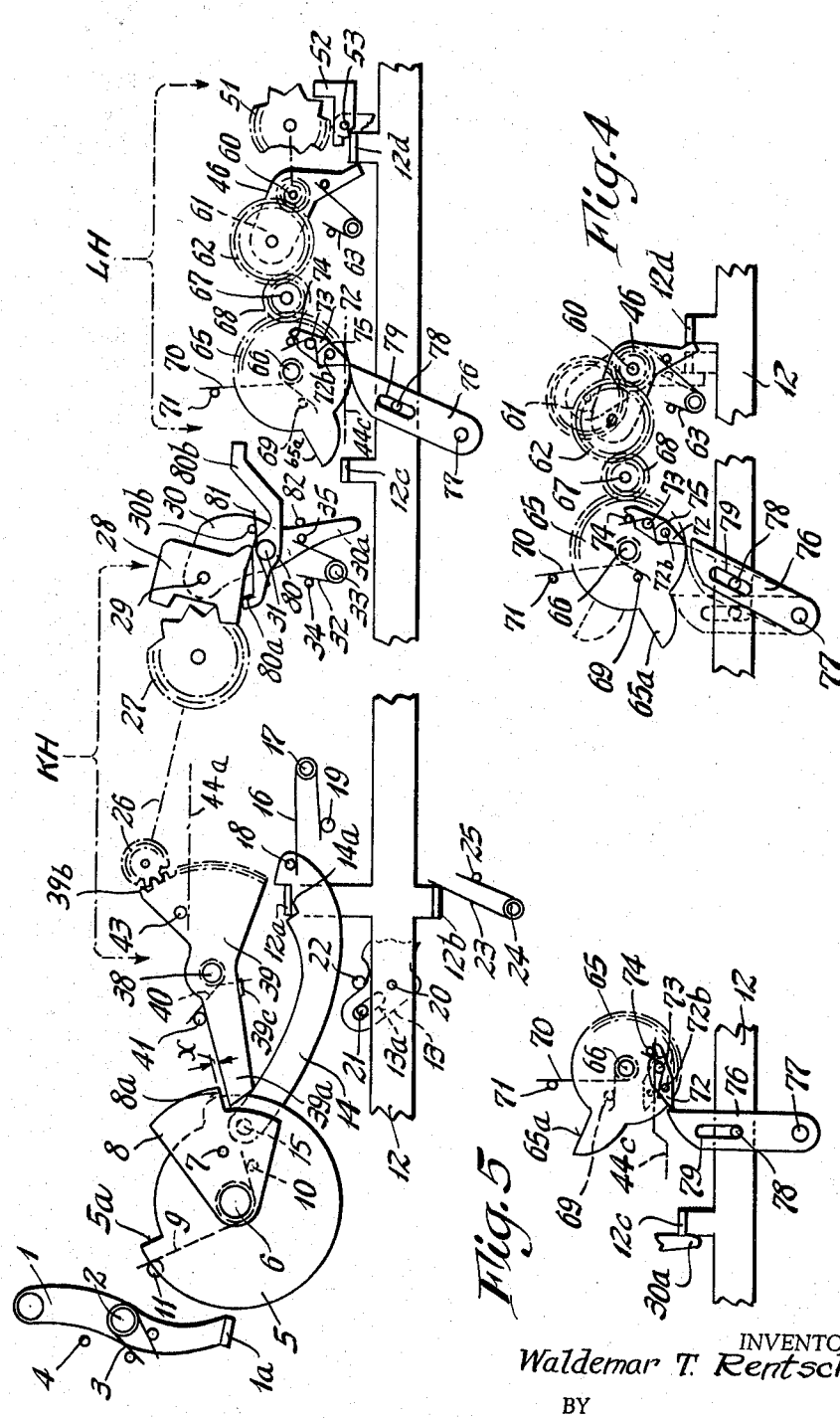

This invention relates to a photographic shutter which has, in addition to a first mechanical escapement mechanism for short exposure times, an additional, or subsidiary, escapement mechanism for long exposure times.

One of the principal objects of this invention is to provide a photographic shutter which is capable of making the usual short-duration exposures and is also capable of making relatively long, automatically-timed exposures.

In accordance with the invention, a device is added to the usual shutter mechanism to become operative when the shutter speed, or exposure time, control is set for long exposure times. In its operative position the device holds the shutter blades in their open position by temporarily locking and then releasing the shutter drive mechanism in accordance with the selected exposure time. The apparatus is so arranged as to operate relatively easily so that very little force is required, and the photographer is not required to make any additional adjustments when setting the shutter for long exposure times since the device is preferably so arranged as to use the same setting member for selecting all exposure times, both long and short.

According to a further improvement of the basic principles of this invention, the long duration, or subsidiary, escapement mechanism is provided with means for cooperating with the locking device to keep the locking device out of engagement in the starting position of the escapement mechanism, then to release the locking device so as to permit it to enter the locking position just as the escapement mechanism leaves its starting position, and later to move the locking device out of its locking position at the end of the operation of the escapement mechanism. As a result, the proper conditions are created to insure a completely independently controlled and therefore dependably functional operation of the locking device in response to the operation of the subsidiary escapement mechanism.

In order to keep the apparatus as simple and inexpensive as possible, a lever is used, one end of which cooperates with the escapement pawl, or anchor, of the main escapement mechanism while the other end of the lever cooperates with a control arm connected with the subsidiary escapement mechanism. The structure is further simplified by rotatably mounting the arresting or braking lever of the locking device on the same axis with the pivoting bridge that carries the escapement anchor.

In order to simplify the operation of the device from the point of view of the photographer, the subsidiary escapement mechanism is shifted into its cocked position by the driving mechanism of the shutter. In order to accomplish this, the invention provides means on the subsidiary escapement mechanism and on the driving member of the shutter blades to move the subsidiary escapement mechanism into its cocked position at the start of the operation of the driving member. This makes it possible to dispense with the special locking device that would otherwise be required to release the subsidiary escapement mechanism for operation when the shutter blades reach their open position.

As for the means for moving the subsidiary escapement mechanism into its cocked position, a driving lever is connected to the driving member of the shutter blades to be used for this purpose. The driving lever cooperates with a stop on the segment wheel of the subsidiary escapement mechanism and automatically moves out of the engagement position at the end of the cocking process. This stop is preferably in the form of a pawl rotatably positioned on a pin on the segment wheel, or gear, of the subsidiary escapement mechanism with one end of the pawl abutting against a pin which is also on the rotatable wheel, thus making the whole stop movable. This movable stop simplifies both the connection of the segment wheel of the subsidiary escapement mechanism to the driving member of the shutter blades and the interruption of this connection. Operation of the shutter may be further simplified in accordance with the invention by means of a cam which is located on the exposure time-setting member, or shutter speed control, and which moves the pawl out of the setting position when the setting member is placed in certain positions.

In order to improve the dependability of the locking device, the segment wheel of the subsidiary escapement mechanism carries, along with the aforementioned pawl, a control arm that cooperates with the arresting lever of the locking device. This further insures the proper cooperation of the two escapement mechanisms as well as the proper operation of the locking device that retains the shutter blades temporarily in their open position.

The subsidiary escapement mechanism may be of a known type referred to generally as a gear escapement mechanism which comprises a plurality of gear groups that cooperate with escapement wheels and anchors, the whole assembly being arranged so that the escapement anchors can be connected or disconnected separately by means of the exposure time-setting member in order to vary the duration of exposure times. This permits the exposure time-setting member to be moved easily, even to those positions corresponding to long exposure times. In addition, there is an intermediate gear between the segment gear and the gear groups of the subsidiary escapement mechanism. This intermediate gear is disengaged during the cocking process of the escapement mechanism and meshes with the gear train just prior to the start of the operation of the subsidiary escapement mechanism. The separation of the segment wheel from the gear groups makes it possible for the driving spring, which performs the work resulting during the normal opening process, to work only against the driving spring of the subsidiary escapement mechanism. As a result, no energy is unnecessarily consumed in overcoming the subsidiary escapement mechanism during the cocking process, and it is thus possible to store the kinetic energy of the shutter blade driving member mainly in the driving spring of the subsidiary escapement mechanism.

The structure is further simplified by arranging the apparatus so that the intermediate gear is carried, for example, by a pivotally supported member, or bridge, one end of which abuts against a control lug on the driving member.

Details of the invention will become apparent from the following specification together with the accompanying drawing in which:

FIG. 1 shows a partial digrammatic view of a photographic shutter according to the invention, the shutter having a main escapement mechanism and being in its cocked position and including a locking device in its unlocked position and a subsidiary escapement mechanism in its uncocked starting position;

FIG. 2 shows the gear groups of the subsidiary escapement mechanism and an exposure time-setting member for controlling the operation of both escapement mechanisms of FIG. 1;

FIG. 3 shows the apparatus of FIG. 1 set for a long exposure time and with the escapement mechanism already in operation to make a photographic exposure;

FIG. 4 shows a portion of the subsidiary escapement mechanism of FIGS. 1 and 3; and FIG. 5 shows a fragment of the apparatus of FIG. 4.

In FIG. 1 a shutter trigger, or release lever, 1 is pivotally mounted on an axle 2 and is urged in the counterclockwise direction by a spring 3 which pushes the lever against a stop 4. At one end of the lever is a lug 1a which engages a substantially radial, latching surface 5a on cocking and driving means in the form of a disc 5 shown in its cocked position. The disc 5 is usually rigidly mounted on a shaft 6 and is firmly connected by a pin 7 to an escapement segment 8 which is also mounted on the cocking shaft 6. A main driving spring 9 is coiled about the shaft 6 and is placed so that one of its ends engages a pin 10 on the escapement segment 8 while the other end bears against a fixed pin 11 to produce a clockwise force on the disc 5 when the latter is in its cocked position.

A shutter blade driving member 12 is connected to a plurality of shutter blades 13, only one of which is shown in the drawing for the sake of clarity. The driving member 12 is operatively connected to the disc 5 by means of a driving pawl 14 which is articulatedly connected to the disc 5 by a pivot pin 15. The pawl has jaws 14a at its free end which engage an actuating lug 12a that extends from the driving member 12. In order to keep the jaws 14a in connection with the lug 12a during the running-down motion, or operation, of the disc 5 from its cocked position, a spring 16 is coiled about a fixed pin 17 and is hooked over a pin 18 on the driving pawl and over a fixed pin 19 so as to exert counterclockwise pressure on the pawl 14.

The driving member 12 is normally made in the form of a ring, although it is shown as a slide in the drawing in order to illustrate the principles of the invention more clearly, and is articulately connected to each of the shutter blades by a pin 20. Each of the blades has a pin-slot connection comprising a slot 13a that engages a fixed pin 21 so that as the driving member 12 moves to the right from its position in FIG. 1, the shutter blades 13 swing to their open position, and as the driving member moves back to the left from its position in FIG. 3, the shutter blades swing back to their closed position. A fixed pin 22 is placed so that the actuating lug 12a rests against it when the driving member is in its starting position. The driving member is held in this position by the force of a spring 23 wound about a pin 24 and placed so that one end engages a lug 12b while the other end presses against a fixed pin 25.

The foregoing shutter driving mechanism is provided with a conventional main escapement mechanism which is suitable for relatively short exposure times from something of the order of 1/500 second to about 1 second. For exposures longer than 1 second, a subsidiary escapement mechanism is provided in accordance with this invention. For the sake of clarity, FIGS. 1 and 3 shows only the essential components of the main and subsidiary escapement mechanisms. The main escapement mechanism is indicated by a dot and dash bracket labeled KH, whereas the subsidiary escapement mechanism is indicated by a second dot and dash bracket and labeled LH.

The main escapement mechanism comprises a plurality of gears 26, escapement wheel 27, and an escapement anchor 28 that cooperates with the wheel to limit its rate of rotation. The anchor 28 is mounted on a pin 29 which, in turn, is mounted on a movable member, such as a swinging or pivoting bridge or support 30, so that the anchor 28 can be brought into engagement with or moved away from the escapement wheel 27 by pivoting the bridge 30. The latter is pivotally mounted on a pin 31 and has an arm 30a which is pressed upon by one end of a spring 32 coiled about the pin 33 and held between a fixed pin 34 and a pin 35 on the arm 30a. The arm 30a is thus pushed against a lug 12c on the driving member 12.

The main escapement mechanism is connected to the driving mechanism 5–10 by means comprising a gear segment 39 which is pivotally mounted on a shaft 38. The gear segment 39 has an actuating arm 39a the outer end of which extends into the path of motion of the stop edge 8a on the escapement segment 8. The teeth 39b of the segment 39 are constantly in mesh with the gear 26 of the escapement mechanism. The arm 39a is so located that, in its starting, or inoperative, position, it engages a fixed pin 41 and is held thereagainst by the pressure of a spring 40 coiled about the shaft 38 and pressing against the pin 41 and against a stop 39c on the segment 39. Another pin 43 on the segment 39 cooperates with a cam edge 44a, which is here indicated by a dot and dash line, of the exposure time setting member, or shutter speed control, 44. The cam edge 44a and the control 44 are more completely illustrated in FIG. 2.

When it is desired to make exposures greater than about one second in length and going up to something of the order of 20 seconds, the subsidiary escapement mechanism is brought into operation. As in indicated in FIG. 2 the subsidiary escapement mechanism may comprise a plurality of gear groups forming a closed gear chain. The individual gear groups are made up of a plurality of gears 46–50, which are meshed together. With each group is associated an escapement wheel 51 to which an escapement anchor 52 can be connected as desired. Each of the escapement anchors 52 is pivotally mounted on a pin 53 on one arm 54a of a bell crank lever 54. The other arm 54b of each of the levers 54 has a control pin 56 that fits into a control slot 44b of the exposure time setting member 44. The configuration of this slot is such that, upon displacement of the exposure time setting member 44 to the left of the position shown in FIG. 2, the bell crank levers 54 are each successively pivoted about their axles 55 so that one escapement anchor 52 after another is removed from engagement with its respective escapement wheel.

Since the subsidiary escapement mechanism is to be moved into its cocked position while the braking influence of the gear groups 46–50 is momentarily eliminated, a support 61 is pivotally arranged on the axle 60 of the gear 46 of the first gear group. One end of this support carries an intermediate gear 62 which meshes with the gear 46. The other end of the support 61 engages a control lug 12d of the driving member 12 and is pressed thereagainst by a coil spring 64 that urges the support in the counterclockwise direction. As may be seen in FIGS. 1, 3, and 4, the subsidiary escapement mechanism also includes a segment gear 65 which acts as driving means for the subsidiary escapement mechanism and is located on a fixed shaft 66 so as to be in constant engagement with a pinion 68 rotatably mounted on a shaft 67. The segment gear 65 has a pin 69 which engages one end of a spring 70 that is coiled about the axle 66. The other end of the spring engages a fixed pin 71 so that, when the segment gear 65 is rotated counterclockwise, the coil spring 70 is stressed so that it can later function as a drive spring for the subsidiary escapement mechanism.

In order to be able to transfer the subsidiary escapement mechanism into its cocked position, which is carried out by means of the driving mechanism 5–10 during the running-down operation of the driving member 12 so as to avoid special operations or manipulations, the segment gear 65 is provided with a stop 72, for example in the form of a pawl, which is rotatably mounted on a pivot pin 73 and which is prevented from counterclockwise rotation thereon by means of a pin 74. A spring 75 presses the pawl against the pin 74. A driving lever 76 is connected to the driving member 12 so that it can cooperate with the pawl 72. For this purpose the driving lever is pivotally mounted on a pin 77 and is provided with a slot 79 that engages a pin 78 on the driving member.

As may be seen in FIGS. 1, 3, and 4 the segment gear 65 has a radially extending control arm 65a which is arranged so as to engage an arresting lever 80 mounted on the axle 31 along with the pivoting bridge 30. One end of a coil spring 81 presses upon a pin 30b on the bridge 30 while the other end of the spring is hooked over the lever 80 so as to exert clockwise torque thereon. The lever 80 has an arm 80a with a hook projection extending therefrom to engage the escapement anchor 28 when it is desired to make exposures of long duration. In order to do this the arm 65a must move away from the lever arm 80b which occurs whenever the driving member 12 moves to the right, as it does when the disc 5, in running-down from its cocked position, causes the pawl 14 to press upon the lug 12a. This, in turn, causes the driving lever 76 to pivot clockwise about the pin 77 and thus to push the pawl 72 and the segment wheel 65 about the shaft 66 in the counterclockwise direction. This rotary motion of the segment wheel 65, during which the driving spring 70 is put under stress, stops immediately before the driving lever 76 reaches its point of reversal, which is indicated by the solid lines in FIG. 4, and slides off of the pawl 72. Since the pivoting bridge 30 is about to pivot counterclockwise under the force of the spring 32 when the driving member 12, and therefore the lug 12c, moves to the right, the escapement anchor 28 engages the escapement wheel 27. This results in blocking the main escapement mechanism and therefore in blocking the driving mechanism 5–10 of the shutter. A fixed stop 82 limits the extent that the bridge 30 may be pivoted so that the escapement anchor 28 is kept in position to operate freely in conjunction with the escapement wheel 27 when the arresting lever 80 remains out of engagement due to the disconnection of the subisidary escapement mechanism.

FIG. 5 shows how the pawl 72 can be moved easily into and out of its operative position in response to the setting of the exposure time setting member 44. For this purpose the pawl 72 has a pin 72b which is engaged by a cam edge 44c of the exposure time setting member. As a result when the latter is set for a short duration exposure (as illustrated in FIG. 5) the cam edge 44c moves the pawl out of the path of the driving lever 76.

The mode of operation of the above-described shutter is as follows:

As the shutter, being in cocked position as shown in FIG. 1, is released by the actuating of the release lever 1, the cocking and driving disc 5 rotates clockwise and pushes the driving pawl 14 to the right, thus serving as the means for moving the driving member 12 to the right and pivoting the shutter blades 13 from their closed position to their open position. The pawl 72 is actuated by means comprising the driving lever 76, which is pivoted clockwise to push on the pawl 72 and so rotate the segment wheel 65, thereby putting the driving spring 70 of the subsidiary escapement mechanism 46–71 under stress. Simultaneously the control arm 65a rotates to release the arresting lever 80 which locks the escapement anchor 28 thus preventing the escapement wheel 27 from rotating. This may be seen particularly in FIG. 3.

Shortly before the cocking and driving disc 5 reaches its point of reversal, which corresponds to the point at which the shutter blades 13 are at their maximum aperture width, the driving lever 76 slides off of the pawl 72 (as is especially apparent in FIGS. 3 and 4). At this instant the escapement segment 8 of the cocking and driving disc 5 has still to travel a small distance $x$ (FIG. 3) until it strikes the actuating arm 39a of the gear segment 39. The distance $x$ is so selected that the support 61, which, until then, is supported by the lug 12d, is released so that the intermediate gear 62 is able to mesh with the pinion 68 as is illustrated in FIG. 4. Thus while the disc 5 is turning through the small distance $x$ the driving member 12 continues to move to the right through a small amount of over travel and at the same time the gear groups 46–50 of the subsidiary escapement mechanism 46–71 are connected to the spring stressed segment wheel 65 and are set into motion which constitutes the running-down motion of the subsidiary escapement mechanism.

When the driving lever 76 slides off of the pawl 72 and when the escapement segment 8 impinges on the arm 39a, the running-down operation of the driving mechanism 5–10 is interrupted, while at the same time the subsidiary escapement mechanism 46–71 is released for its running-down operation. During this time the segment wheel 65 rotates retrogressively about its axle 66. The rotary motion of the segment wheel is slowed down by the braking effect of the individual escapement gear groups 46–50 until the control arm 65a engages the braking lever 80 of the locking device that includes both the braking lever 80, and the escapement anchor 28. In the final phase of its motion the arm 65a overcomes the force of the spring 81, which constitutes the means for connecting the locking device to the main escapement mechanism, and pivots the braking lever clockwise on the shaft 31 which releases the escapement anchor 28 so that the driving mechanism 5–10 is free to move again while simultaneously overcoming the braking effect of the main escapement mechanism. The resultant rotary motion of the cocking and driving disc 5 results in a return motion of the driving member 12 to the left from the position that it occupies in FIG. 3. This causes the shutter blades 13 to be pivoted from their wide open position to their closed position which is reached when the operation of the driving member 12 stops at the time that the lug 12a strikes the end stop 22. The elements 72–78 constitute means for connecting the subsidiary escapement mechanism 46–71 to the locking lever 80.

In order to change the shutter so that it operates for short exposures the exposure time setting member 44, as shown in FIG. 2, is moved to the left. As the member 44 moves along, one after another of the pins 56 must move upwardly as they follow the convolutions of the guiding slot 44b. This causes the individual gear groups 46–50 or the individual escapement anchors 52 to move successively out of engagement. Simultaneously with this movement of the exposure time setting member 44, the cam edge 44c lifts up the pin 72b of the pawl 72 and moves the pawl out of the path of motion of the driving member 76. The additional setting cam 44a, which is also part of the exposure time setting member 44, simultaneously lifts up the pin 43 of the gear segment 39 and moves the same to a setting position which corresponds to the selected exposure time.

Thereafter, when the release lever 1 is actuated, the disc 5 will rotate clockwise and thus actuate the driving pawl 14 so as to operate the driving member 12 and the shutter blades 13 to cause the latter to move from their closed position to their open position and back to their closed position. During the rotary motion of the disc 5, its escapement segment 8 strikes the actuating arm 39a of the gear segment 39 so that the speed of rotation of the disc 5 is slowed down in accordance with the selected exposure time. Because of the fact that the pawl 72 has been lifted out of the path of movement of the driving lever 76, the driving lever is free to pivot about its axle 77 during the running-down operation of the driving member 12.

I claim:

1. A photographic shutter comprising a shutter blade; a shutter blade driving member connected thereto; a driving mechanism connected to said driving member; a main escapement mechanism connected to said driving mechanism to control the operating speed thereof; a subsidiary escapement mechanism; and a locking device connected to said main escapement mechanism and controlled by said subsidiary escapement mechanism to interrupt the operation of said main escapement mechanism and thereby the operation of said driving mechanism for a predetermined period of time with said blade in its open position and said main escapement mechanism cocked.

2. A photographic shutter comprising a shutter blade; a shutter blade driving member connected thereto; a driving mechanism connected to said driving member; a main escapement mechanism connected to said driving mechanism to control the operating speed thereof; a subsidiary escapement mechanism; a locking device connected to said main escapement mechanism and controlled by said subsidiary escapement mechanism to interrupt the operation and thereby the operation of said driving mechanism for a predetermined period of time with said blade in its open position and said main escapement mechanism cocked; and a common exposure time setting member connected to both of said escapement mechanisms to control the operation thereof.

3. A photographic shutter comprising a shutter blade; a shutter blade driving member connected thereto; a driving mechanism connected to said driving member; a short duration escapement mechanism connected to said driving mechanism to control the operating speed thereof; a locking device; a long duration escapement mechanism; means for connecting said long duration escapement mechanism to said locking device; means for connecting said locking device to said short duration escapement mechanism to interrupt the running-down operation of said short duration escapement mechanism and thereby the operation of said driving mechanism for a predetermined period of time with said blade in its open position and said short duration escapement mechanism cocked; and a common exposure time setting member connected to both of said escapement mechanisms to control the operation thereof.

4. A photographic shutter comprising a shutter blade; a shutter blade driving member connected thereto; a driving mechanism connected to said driving member to move said shutter blade from a closed position to an open position and back to a closed position; a short duration escapement mechanism connected to said driving mechanism to control the duration of the time that said shutter blade remains in its open position, said escapement mechanism comprising an escapement wheel and an escapement anchor; a locking device; a long duration escapement mechanism; and means for disconnecting said long duration escapement mechanism from said locking device when said shutter blade is in an open position whereby said locking device locks said escapement anchor and escapement wheel together to interrupt the running down operation of said short duration escapement mechanism and thereby the operation of said driving mechanism for a predetermined period of time with said blade in its open position and said short duration escapement mechanism cocked.

5. A photographic shutter comprising a shutter blade; a shutter blade driving member connected thereto; a driving mechanism connected to said driving member to move said shutter blade from a closed position to an open position and back to a closed position; a short duration escapement mechanism connected to said driving mechanism to control the duration of the time that said shutter blade remains in its open position, said escapement mechanism comprising an escapement wheel and an escapement anchor; a locking lever; a long duration escapement mechanism; and means for disconnecting said long duration escapement mechanism from said lever when said shutter blade is in an open position whereby said lever locks said escapement anchor and escapement wheel together to interrupt the running-down operation of said short duration escapement mechanism and thereby the operation of said driving mechanism for a predetermined period of time with said blade in its open position and said short duration escapement mechanism cocked.

6. A photographic shutter comprising a shutter blade; a shutter blade driving member connected thereto; a driving mechanism connected to said driving member to move said shutter blade from a closed position to an open position and back to a closed position; a short duration escapement mechanism connected to said driving mechanism to control the duration of the time that said shutter blade remains in its open position, said escapement mechanism comprising an escapement wheel and an escapement anchor; a long duration escapement mechanism comprising a pivotally mounted arm; a locking device comprising a lever extending into the path of said arm; and means for disconnecting said long duration escapement mechanism from said locking device when said shutter blade is in an open position whereby said locking device locks said escapement anchor and escapement wheel together to interrupt the running-down operation of said short duration escapement mechanism and thereby the operation of said driving mechanism for a predetermined period of time with said blade in its open position and said short duration escapement mechanism cocked until said arm pivots to engage said lever.

7. A photographic shutter comprising a shutter blade; a shutter blade driving member connected thereto; a driving mechanism connected to said driving member to move said shutter blade from a closed position to an open position and back to a closed position; a short duration escapement mechanism comprising an escapement wheel and an escapement anchor; an axle; a support member pivotally supported on said axle and controlled by said driving member and supporting said anchor to bring said anchor into operation with said wheel to control the duration of time that said shutter blade remains in its open position; a long duration escapement mechanism comprising a pivotally mounted arm; a locking lever pivotally mounted on said axle and extending into the path of said arm; and means for disconnecting said long duration escapement mechanism from said locking lever when said shutter blade is in an open position, whereby said locking lever locks said anchor and wheel together to interrupt the running-down operation of said short duration escapement mechanism and thereby the operation of said driving mechanism for a predetermined period of time with said blade in its open position and said short duration escapement mechanism cocked until said arm pivots to engage said lever.

8. A photographic shutter comprising a shutter blade; a driving member connected thereto; a driving mechanism connected to said driving member to operate the same; a main escapement mechanism connected to said driving mechanism to control the duration of the time when said shutter blade is in an open position, said escapement mechanism being connected to said driving mechanism when said shutter is in its open position; a subsidiary escapement mechanism; a driving spring for operating said subsidiary escapement mechanism; a locking device connected to said main escapement mechanism and controlled by said subsidiary escapement mechanism to interrupt the operation of said main escapement mechanism and thereby the operation of said driving mechanism for a predetermined period of time with said blade in its open postion and said main escapement mechanism cocked; and means connecting said driving member to said spring to stress the same during the time that said driving member moves said shutter blade to its open position.

9. A photographic shutter comprising a shutter blade; a driving member connected thereto; a driving mechanism connected to said driving member to operate the same; a main escapement mechanism connected to said driving mechanism to control the duration of the time when said shutter blade is in an open position, said escapement mechanism being connected to said driving mechanism when said shutter is in its open position, said main escapement mechanism comprising an escapement wheel and an anchor; a subsidiary escapement mechanism comprising an arm rotatable through a predetermined arc in a controllable period of time; a pivotal locking member engageable with said anchor and with said rotating arm to be controlled by said arm to be lifted away from said anchor as said arm reaches the end of its arc to disengage said lock from said anchor and permit said main escapement mechanism to run down, said driving mechanism being held stationary until said main escapement mechanism has run down; means connecting said driving member to said subsidiary escapement mechanism to cock the same during the time that said driving member moves said shutter blade to its open position; and means to release said subsidiary escapement mechanism for running-down at the end of the cocking process.

10. A photographic shutter comprising a shutter blade; a driving member connected thereto; a driving mechanism connected to said driving member to operate the same; a main escapement mechanism connected to said driving mechanism to control the duration of the time when said shutter blade is in an open position; an arm connecting said escapement mechanism to said driving mechanism when said shutter is in its open position to retain said shutter in its open position until said escapement mechanism has run down; a long duration escapement mechanism; a stop pivotally connected to said long duration escapement mechanism and connected to said short duration escapement mechanism to hold the same in cocked position and thereby to stop the running down of said driving mechanism until said long duration escapement mechanism has completed its running down; a second stop pivotally connected to said long duration escapement mechanism; and a driving lever connected to said driving member to engage said second stop in order to cock said long duration escapement mechanism during the time that said driving member moves said shutter blade to its open position, said stop and said driving lever automatically becoming disengaged at the end of the cocking process.

11. A photographic shutter comprising a shutter blade; a driving member connected thereto; a driving mechanism connected to said driving member to operate the same; a short duration escapement mechanism connected to said driving mechanism to control the duration of the time when said shutter blade is in an open position, said escapement mechanism being connected to said driving mechanism when said shutter is in its open position; a long duration escapement mechanism comprising a segment wheel; a pawl pivotally mounted on said segment wheel; a stop limiting the rotation of said pawl; a locking device connected to said short duration escapement mechanism and controlled by said long duration escapement mechanism to interrupt the operation of said short duration escapement mechanism and thereby the operation of said driving mechanism for a predetermined period of time with said blade in its open position and said main escapement mechanism cocked; and a driving lever connected to said driving member to engage said pawl to rotate said segment wheel in order to cock said long duration escapement mechanism during the time that said driving member moves said shutter blade to its open position, said pawl and said driving lever automatically becoming disengaged at the end of the cocking process.

12. A photographic shutter comprising a shutter blade; a driving member connected thereto; a driving mechanism connected to said driving member to operate the same; a short duration escapement mechanism connected to said driving mechanism to control the duration of the time when said shutter blade is in an open position, said escapement mechanism being connected to said driving mechanism when said shutter is in its open position; a long duration escapement mechanism comprising a segment wheel; a pawl pivotally mounted on said segment wheel; a stop limiting the rotation of said pawl; a driving lever connected to said driving member to engage said pawl to rotate said segment wheel in order to cock said long duration escapement mechanism during the time that said driving member moves said shutter blade to its open position, said pawl and said driving lever automatically becoming disengaged at the end of the cocking process; and an exposure time control member; and means controlled by said exposure time setting member to engage said pawl and to pivot said pawl out of the path of movement of said driving lever.

13. A photographic shutter comprising a shutter blade; a shutter blade driving member connected thereto; a driving mechanism connected to said driving member to move said shutter blade from a closed position to an open position and back to a closed position; a short duration escapement mechanism comprising an escapement wheel and an escapement anchor; an axle; a support member pivotally supported on said axle and controlled by said driving member and supporting said anchor to bring said anchor into operation with said wheel to control the duration of time that said shutter blade remains in its open position; a long duration escapement mechanism comprising a segment wheel and a pivotally mounted arm thereon; a locking lever pivotally mounted on said axle and extending into the path of said arm; a pawl pivotally mounted on said segment wheel; a stop limiting the rotation of said pawl; and a driving lever connected to said driving member to engage said pawl to rotate said segment wheel in order to cock said subsidiary escapement mechanism during the time that said driving member moves said shutter blade to its open position, said pawl and said driving lever automatically becoming disengaged at the end of the cocking process.

14. A photographic shutter comprising a shutter blade; a shutter blade driving member connected thereto; a driving mechanism connected to said driving member; a short duration escapement mechanism connected to said driving mechanism to control the operating speed thereof; a long duration escapement mechanism comprising a plurality of gear groups having escapement anchors; means for connecting said long duration escapement mechanism to said main escapement mechanism to interrupt the operation of said short duration escapement mechanism and thereby the operation of said driving mechanism for a predetermined period of time with said blade in its open position and said short duration escapement mechanism cocked; an exposure time setting member connected to said main escapement mechanism to control the operation thereof; and separate means connecting each of said gear groups or escapement anchors to said exposure time setting member to connect and disconnect said gear groups individually.

15. A photographic shutter comprising a shutter blade; a shutter blade driving member connected thereto; a driving mechanism connected to said driving member; a short duration escapement mechanism connected to said driving mechanism to control the operating speed thereof; a long duration escapement mechanism comprising a segment wheel and a plurality of gear groups; and means comprising an intermediate gear between said segment wheel and said gear groups for connecting said gear groups to said segment wheel immediately before the running-down operation of said long duration escapement mechanism, whereby said long duration escapement mechanism is connected to said short duration escapement mechanism and thereby the operation of said driving mechanism for the duration of the running-down motion of said long duration escapement mechanism.

16. A photographic shutter comprising a shutter blade; a shutter blade driving member connected thereto; a driving mechanism connected to said driving member; a short duration escapement mechanism connected to said driving mechanism to control the operating speed thereof; a long duration escapement mechanism comprising a segment wheel and a plurality of gear groups; and means comprising a pivotal support connected to said driving member to be controlled thereby, and an intermediate gear mounted on said support between said segment wheel and said gear groups for connecting said gear groups to said segment wheel when said driving member pivots said support immediately before the running-down operation of said long duration escapement mechanism, whereby said long duration escapement mechanism is connected to said short duration escapement mechanism to interrupt the operation of said short duration escapement mechanism for the duration of the running-down motion of said long duration escapement mechanism.

References Cited by the Examiner
UNITED STATES PATENTS

| | | | |
|---|---|---|---|
| 1,053,152 | 2/1913 | Bruns | 95—63 |
| 1,696,264 | 12/1928 | Brueck | 95—63 |
| 1,751,935 | 3/1930 | Gauthier | 95—63 |
| 2,129,561 | 10/1938 | Brueck | 95—63 |
| 2,961,935 | 11/1960 | Rentschler | 95—63 |

JOHN M. HORAN, *Primary Examiner.*